(12) United States Patent
Cawse et al.

(10) Patent No.: US 8,946,322 B2
(45) Date of Patent: *Feb. 3, 2015

(54) THERMOSETTING RESIN CONTAINING IRRADIATED THERMOPLASTIC TOUGHENING AGENT

(75) Inventors: John L. Cawse, West Wratting (GB); Stephen Mortimer, St. Ives (GB); Chrisopher J. Wade, Cherry Hinton (GB)

(73) Assignee: Hexcel Composites Ltd, Cambridge (GB)

( * ) Notice: Subject to any disclaimer, the term of this patent is extended or adjusted under 35 U.S.C. 154(b) by 500 days.

This patent is subject to a terminal disclaimer.

(21) Appl. No.: 12/937,117

(22) PCT Filed: Apr. 14, 2008

(86) PCT No.: PCT/IB2008/000969
§ 371 (c)(1),
(2), (4) Date: Oct. 8, 2010

(87) PCT Pub. No.: WO2009/127891
PCT Pub. Date: Oct. 22, 2009

(65) Prior Publication Data
US 2011/0034591 A1 Feb. 10, 2011

(51) Int. Cl.
C08J 3/28 (2006.01)
C08G 73/10 (2006.01)
C08L 79/08 (2006.01)
C08L 81/06 (2006.01)
C08J 5/24 (2006.01)
C08L 63/00 (2006.01)
C08G 59/32 (2006.01)
C08G 59/44 (2006.01)
C08G 59/50 (2006.01)
C08L 61/00 (2006.01)

(52) U.S. Cl.
CPC ........ *C08G 73/1046* (2013.01); *C08G 59/3227* (2013.01); *C08J 3/28* (2013.01); *C08J 5/24* (2013.01); *C08L 63/00* (2013.01); *C08L 79/08* (2013.01); *C08L 81/06* (2013.01); C08J 2363/00 (2013.01); C08J 2371/12 (2013.01); C08J 2379/08 (2013.01); C08J 2381/06 (2013.01); C08L 61/00 (2013.01); C08L 2205/22 (2013.01)
USPC ........... 523/400; 522/174; 522/180; 522/181; 525/422; 525/499; 525/535; 525/537

(58) Field of Classification Search
CPC ............ C08L 63/00; C08L 39/04; C08J 3/28
See application file for complete search history.

(56) References Cited

U.S. PATENT DOCUMENTS

| | | | | |
|---|---|---|---|---|
| 3,959,101 | A * | 5/1976 | Staniland et al. | 522/180 |
| 4,945,154 | A * | 7/1990 | Ghali et al. | 528/480 |
| 5,726,216 | A | 3/1998 | Janke et al. | |
| 5,730,764 | A * | 3/1998 | Williamson et al. | 51/295 |
| 5,877,229 | A * | 3/1999 | Janke et al. | 522/31 |
| 6,333,390 | B1 * | 12/2001 | Moore et al. | 528/28 |
| 6,838,490 | B2 * | 1/2005 | Zhang et al. | 522/148 |
| 2003/0088036 | A1 * | 5/2003 | Huang et al. | 525/523 |
| 2003/0190472 | A1 * | 10/2003 | Moussa | 428/403 |
| 2006/0292375 | A1 * | 12/2006 | Martin | 428/413 |

FOREIGN PATENT DOCUMENTS

| | | | |
|---|---|---|---|
| DE | EP 0238447 | * | 9/1987 |
| EP | 0238447 A | * | 9/1987 |
| EP | 1262510 | | 12/2002 |
| UA | 33826 | | 7/2008 |
| WO | WO 97/05172 | * | 2/1997 |
| WO | 2001/87583 | | 11/2001 |
| WO | 2007/001705 | | 1/2007 |
| WO | WO 2008/040963 | * | 4/2008 |

OTHER PUBLICATIONS

H. Lee; K. Neville, Handbook of Epoxy Resins, 1967, McGraw-Hill, Chapter 10, p. 16.*
Sasuga, et al., Polymer 40 (1999) pp. 5095-5102.
Encyclopedia of Polymer Science and Technology, Radiation Chemistry of Polymers, pp. 1-55 (2005).
Jingye Li, et al., Prepararation of the crosslinked polyethersulfone filims by high-temperature electron-beam irradiation, Polymer Degradation and Stability, 91 (2006), pp. 2867-2873.

* cited by examiner

*Primary Examiner* — Randy Gulakowski
*Assistant Examiner* — Ha Nguyen
(74) *Attorney, Agent, or Firm* — W. Mark Bielawski; David J. Oldenkamp

(57) ABSTRACT

Thermosetting resins are provided that are toughened with an irradiated thermoplastic toughening agent and which have reduced levels of solvent-induced micro crack formation. The thermoplastic toughening agent is treated with a sufficient amount of high-energy radiation (e.g. electron beam or gamma rays) to cause a reduction in solvent-induced micro crack formation in the cured resin when compared to the same toughened thermosetting resin in which the non-irradiated version of the thermoplastic toughening agent is used.

20 Claims, No Drawings

THERMOSETTING RESIN CONTAINING IRRADIATED THERMOPLASTIC TOUGHENING AGENT

BACKGROUND OF THE INVENTION

1. Field of the Invention

The present invention relates generally to composite materials that include a thermosetting resin matrix, which is toughened with a thermoplastic toughening agent. More particularly, the present invention is directed to reducing the formation of solvent-induced micro cracks that are known to occur in such thermoplastic toughened resin matrices.

2. Description of Related Art

The two principal components of a typical composite material are the polymeric resin matrix and the fibrous reinforcement. In the aerospace industry, thermosetting resins are commonly used as one of the major ingredients in a variety of resin matrices. Epoxy resins, bismaleimide resins and cyanate ester resins are common thermosetting resins. It is a popular practice to "toughen" these thermosetting resins by adding varying amounts of a thermoplastic toughening agent. Polyether sulfone (PES), polyether ethersulfone (PEES) and polyether imide (PEI) are a few examples of thermoplastic toughening agents that have been routinely added to thermosetting resins.

Thermosetting resins, like many other polymeric resins, can be vulnerable to attack by certain liquids, such as solvents, that come into contact with the cured resin. For example, many primers and paints in the aerospace industry use a variety of solvents, such as methyl ethyl ketone (MEK), methyl isobutyl ketone (MIBK), xylene, toluene, isobutyl acetate, ethanol, n-butyl acetate, isopropyl alcohol, glycol ethers and glycol esters. Many of these solvents are known to attack the resin surface during application of the primer and/or paint to the finished composite part. The result of this attack is the formation of micro cracks that can penetrate to varying depths within the resin. These micro cracks can have a substantial and deleterious effect on the physical strength of the finished composite part.

Composite parts may also be exposed to a variety of solvents and caustic liquids that are used to clean the composite part or remove old paint prior to re-painting of the part. Paint stripping liquids typically include strong solvents, such as acetone, MEK and chlorinated hydrocarbons, which are capable of forming micro cracks in the resin matrix. In addition, the resin matrix may unintentionally be exposed to micro crack-forming solvents or liquids during the lifetime of the composite part. For example, the resin matrix may be exposed to solvents or other possibly harmful liquids due to leaks in a given fluid system where the composite part may be located.

An epoxy-based matrix resin that includes PES and/or PEES or their copolymers as the thermoplastic toughening agent is a rather common resin matrix for aerospace applications. In many cases, however, the final toughened epoxy resin is susceptible to solvent attack and the formation of micro cracks with the resultant negative effect on mechanical stability of the composite part. One approach to avoid the undesirable formation of micro cracks is to use chemically reactive grades of PES and/or PEES. For example, reduction in micro crack formation has been achieved by using amino-terminated PES instead of hydroxyl-terminated PES that is usually used to toughen epoxy resins. However, amino-terminated PES is more difficult and expensive to prepare than the less chemically reactive hydroxyl-terminated PES.

In view of the above, there is a continuing need to develop a simple, efficient and cost effective way to eliminate, or at least substantially reduce, the susceptibility of thermoplastic toughened thermosetting matrix resins to solvent-induced micro cracking.

SUMMARY OF THE INVENTION

In accordance with the present invention, thermosetting resins are provided that are toughened with a thermoplastic toughening agent and which have reduced levels of solvent-induced micro crack formation. The invention is based on the discovery that treating the thermoplastic toughing agent with high-energy radiation causes a reduction in solvent-induced micro crack formation when compared to the same toughened thermosetting resin in which the non-irradiated version of the thermoplastic toughening agent is used.

The present invention covers both the cured and uncured forms of the resin composition as well as prepreg containing the uncured resin and finished products. The resin composition includes a thermosetting resin component, an irradiated thermoplastic toughening agent and a curing agent. The irradiated thermoplastic toughening agent is formed prior to mixing with the thermosetting resin component and curing agent. Although not wishing to be bound by any particular theory, it is believed that exposing the toughening agent to high-energy radiation causes branching of the thermoplastic polymer, which results in a measurable increase in the molecular weight of the thermoplastic polymer. It is this radiation induced branching that is believed to be responsible for the observed reduction in micro crack formation of the toughened thermosetting resin matrix.

In accordance with the present invention, it was discovered that using an irradiated thermoplastic toughening agent provides a desired reduction in solvent-induced micro cracking without adversely affecting the other physical properties of the resulting toughened resin. This is particularly important in aerospace and other high stress applications where it is essential that the physical strength and toughness of the resin matrix not be compromised by an alteration of the thermoplastic toughening agent.

Radiation pre-treatment of the toughening agent to form an irradiated thermoplastic toughening agent prior to mixing with the thermosetting resin and curing agent is a simple, efficient and cost effective way to substantially reduce the number of solvent-induced micro cracks that are typically observed with a non-irradiated toughening agent. The radiation pre-treatment process is well suited for large scale and high volume operations due to the simplicity and ease with which the thermoplastic toughening agent can be irradiated prior to use. As an additional advantage, the radiation treatment is believed to cause permanent changes in the thermoplastic toughening agent, so that the irradiated toughening agent is a stable additive that may be stored indefinitely prior to use.

As another advantage, the type and amount of radiation that is used to treat the thermoplastic agent can be accurately controlled. This insures that the character and quality of commercial scale amounts of irradiated thermoplastic toughening agent can be kept within established quality assurance goals.

The above described and many other features and attendant advantages of the present invention will become better understood by reference to the following detailed description.

DETAILED DESCRIPTION OF THE INVENTION

The present invention may be used to reduce the formation of micro cracks in any thermosetting resin that is toughened with a thermoplastic toughening agent. Such resins typically include a thermosetting resin component, a thermoplastic toughening agent and a curing agent. In addition, the resin may contain any number of known additives and/or fillers that are commonly used in such resins. The invention basically involves pre-treating all or at least a substantial portion of the thermoplastic toughening agent with a sufficient amount of high-energy radiation to form an irradiated thermoplastic toughening agent, which when used in place of the non-irradiated toughening agent provides a reduction in the formation of micro cracks in the cured resin. The invention is applicable to epoxy, cyanate ester and bismaleimide resins. Epoxy resins are preferred.

The epoxy resin may be a mixture of one or more difunctional, trifunctional and tetrafunctional epoxies. The invention is particularly well suited for reducing micro crack formation in epoxy resins that are composed principally of trifunctional and tetrafunctional resins. Epoxy resins of this type are particularly preferred for high performance applications such as aerospace structures. The relative amounts and types of difunctional, trifunctional and tetrafunctional epoxy resin may be varied widely. For example, the thermosetting resin component may include 0-60 wt % difunctional epoxy resin, 0-80 wt % trifunctional epoxy resin and 0-80 wt % tetrafunctional epoxy resin. More preferably, the thermosetting resin component will contain 0-40 wt % difunctional epoxy resin, 20-60 wt % trifunctional epoxy resin and 20-60 wt % tetrafunctional epoxy resin. Most preferred are thermosetting resins that contain 0-20 wt % difunctional epoxy resin, 40-60 wt % trifunctional epoxy resin and 40-60 wt % tetrafunctional epoxy resin.

The difunctional epoxy resin used to form the thermosetting resin component may be any suitable difunctional epoxy resin that is typically used in aerospace composites. It will be understood that this includes any suitable epoxy resins having two epoxy functional groups. The difunctional epoxy resin may be saturated, unsaturated, cylcoaliphatic, alicyclic or heterocyclic.

Exemplary difunctional epoxy resins include those based on diglycidyl ether of Bisphenol F, Bisphenol A (optionally brominated), glycidyl ethers of phenol-aldehyde adducts, glycidyl ethers of aliphatic diols, diethylene glycol diglycidyl ether, Epikote, Epon, aromatic epoxy resins, epoxidised olefins, brominated resins, aromatic glycidyl anilines, heterocyclic glycidyl imidines and amides, fluorinated epoxy resins, or any combination thereof. The difunctional epoxy resin is preferably selected from diglycidyl ether of Bisphenol F, diglycidyl ether of Bisphenol A, diglycidyl dihydroxy naphthalene, or any combination thereof. Most preferred are diglycidyl ethers of Bisphenol A and F. Diglycidyl ethers of Bisphenol A and F are available commercially from Huntsman Advanced Materials (Brewster, N.Y.) under the trade name Araldite. A single difunctional epoxy resin may be used alone or in any suitable combination with other difunctional epoxies.

The trifunctional and tetrafunctional epoxy resins may be saturated, unsaturated, cylcoaliphatic, alicyclic or heterocyclic. Exemplary trifunctional and tetrafunctional epoxy resins include those based upon phenol and cresol epoxy novolacs, glycidyl ethers of phenol-aldelyde adducts; aromatic epoxy resins; trifunctional aliphatic glycidyl ethers, aliphatic polyglycidyl ethers; epoxidised olefins; brominated resins; aromatic glycidyl amines; the polyglycidyl derivatives of aminophenols; heterocyclic glycidyl imidines and amides; fluorinated epoxy resins or any combination thereof.

A trifunctional epoxy resin will be understood as having the three epoxy groups substituted either directly or indirectly on the phenyl ring in the backbone of the compound. A tetrafunctional epoxy resin will be understood as having the four epoxy groups substituted either directly or indirectly on the phenyl ring in the backbone of the compound. The phenyl ring may additionally be substituted with other suitable non-epoxy substituent groups. Suitable substituent groups, by way of example, include hydrogen, hydroxyl, alkyl, alkenyl, alkynyl, alkoxyl, aryl, aryloxyl, aralkyloxyl, aralkyl, halo, nitro, or cyano radicals. Suitable non-epoxy substituent groups may be bonded to the phenyl ring at any position not occupied by an epoxy group.

Suitable tetrafunctional epoxy resins include N,N,N',N'-tetraglycidyl-m-xylenediamine which is available commercially from Mitsubishi Gas Chemical Company (Chiyoda-Ku, Tokyo, Japan) under the name Tetrad-X, and Erisys GA-240 which is available from CVC Chemicals, (Morristown, N.J.).

Exemplary trifunctional epoxy resins include the triglycidyl ether of para aminophenol, which is available commercially as Araldite MY 0500 or MY 0510 from Huntsman Advanced Materials (Brewster, N.Y.) and the triglycidyl ether of meta-aminophenol, which is also available commercially from Huntsman Advanced Materials (Brewster, N.Y.) under the trade name Araldite MY0600, and from Sumitomo Chemical Co. (Osaka, Japan) under the trade name ELM-120. Other exemplary commercially available trifunctional epoxy resins include the triglycidyl ether of tri(4-hydroxyphenyl)methane, available as Tactix 742; and the triglycidyl ether of 1,1,1-tri(4-hydroxyphenyl)ethane available from CVC Chemicals as Epalloy 9000.

Exemplary tetrafunctional epoxy resins include the tetraglycidyl amine of methylenebisaniline, which is available commercially as Araldite MY9512 from Huntsman Advanced Materials (Brewster, N.Y.) and N,N,N',N'-tetraglycidyl-4,4'-diaminodiphenyl methane (TGDDM), which is also available commercially as Araldite MY720 and MY721 from Huntsman Advanced Materials (Brewster, N.Y.) or ELM 434 from Sumitomo Chemical Co. (Osaka, Japan).

Exemplary cyanate ester resins that may be used to form the thermosetting resin component include the cyanate esters of Bisphenol A, Bisphenol E, Bisphenol S, thiodiphenol and of the adducts of phenol with 5-norbornene-2,3-cyclopentane. Exemplary commercially available cyanate ester resins include Arocy L10, Arocy T10, Arocy B10 and Arocy M10 available from Huntsman Advanced Materials An individual cyanate ester resin may be used alone or in combination with other types of cyanate ester resins and/or in combination with epoxy resins in accordance with typical formulations used in the aerospace industry.

Exemplary bismaleimide resins that may be used to form the thermosetting resin component include the bismaleimide derivatives of methylenebisaniline, diaminobenzenes, diaminotoluenes and hexamethylene diamine, and diallyl derivatives such as the diallyl derivative of Bisphenol A. Exemplary commercially available bismaleimide resins include those supplied by HOS technik, St. Stefan, Austria, under the Homide tradename and those supplied by Huntsman under the Matrimid tradename. An individual bismaleimide may be used alone or in combination with other types of bismaleimide resins and/or other thermosetting resins in accordance with typical formulation used in the aerospace industry.

The thermosetting resin component typically is the principal ingredient in the uncured resin composition or matrix. The amount of thermosetting resin component will range from 40 wt % to 90 wt % of the total uncured resin composition. Preferably, the thermosetting resin component will be present in amounts of from 60 wt % to 80 wt %.

The thermoplastic toughening agent may be any of the typical thermoplastic materials that are used to toughen thermosetting aerospace resins. The toughening agents are polymers, which can be in the form of homopolymers, copolymers, block copolymers, graft copolymers, or terpolymers. The thermoplastic toughening agents are thermoplastic resins having single or multiple bonds selected from carbon-carbon bonds, carbon-oxygen bonds, carbon-nitrogen bonds, silicon-oxygen bonds, and carbon-sulphur bonds. One or more repeat units may be present in the polymer which incorporate the following moieties into either the main polymer backbone or to side chains pendant to the main polymer backbone: amide moieties, imide moieties, ester moieties, ether moieties, carbonate moieties, urethane moieties, thioether moieties, sulphone moieties and carbonyl moieties. The particles of thermoplastic polymer may be either crystalline or amorphous or partially crystalline.

Suitable examples of thermoplastic materials that are used as a toughening agent include polyamides, polycarbonates, polyacetal, polyphenylene oxide, polyphenylene sulphide, polyarylates, polyethers, polyesters, polyimides, polyamidoimides, polyether imides, polysulphones, polyurethanes, polyether sulphones, polyether etherstilfones, polyphenyl sulfones and polyether ketones, Polyether sulfones and polyether ethersulfones, are the preferred type of thermoplastic material, However, the other types of thermoplastic materials may be used provided that they are amenable to treatment with high-energy radiation, as described below, to provide an irradiated thermoplastic toughening agent that reduces the amount of micro cracking in a given thermosetting resin. The amount of toughening agent present in the uncured resin composition will typically range from 5 to 50 wt %. Preferably, the amount of toughening agent will range from 15 wt % to 30 wt %.

Examples of commercially available thermoplastic toughening agents include Sumikaexcel 5003P PES, which is available from Sumitomo Chemicals Co. (Osaka, Japan) and Solvay Radel A, which is a copolymer of ethersulfone and etherethersulfone monomer units that is available from Solvay Engineered Polymers, Auburn Hills, USA. Optionally, these PES or PES-PEES copolymers may be used in a densified form. The densification process is described in U.S. Pat. No. 4,945,154.

The resin compositions of the present invention include at least one curing agent. Suitable curing agents are those that facilitate the curing of the epoxy-functional compounds and, particularly, facilitate the ring opening polymerization of such epoxy compounds. Preferred curing agents include those compounds that polymerize with the epoxy-functional compound or compounds, in the ring opening polymerization thereof. Two or more such curing agents may be used in combination. For cyanate ester resins and bismaleimide resins, the curing agent can be any of the typical curing agents used in the aerospace industry. For example, cyanate esters may be cured simply by heating or may be catalyzed by adding metal carboxylates and chelates such as the acetylacetonates of cobalt, copper, manganese and zinc together with other additives such as nonylphenol.

Suitable curing agents for use in curing epoxy-based thermosetting resin components include anhydrides, particularly polycarboxylic anhydrides, such as nadic anhydride (NA), methylnadic anhydride (MNA), phthalic anhydride, tetrahydrophthalic anhydride, hexahydrophthalic anhydride (HHPA), methyltetrahydrophthalic anhydride (MTHPA), methylhexahydrophthalic anhydride (MHHP), endomethylene-tetrahydrophthalic anhydride, hexachloroendomethylene-tetrahydrophthalic anhydride (Chlorentic Anhydride), trimellitic anhydride, pyromellitic dianhydride, maleic anhydride (MA), succinic anhydride (SA), nonenylsuccinic anhydride, dodecenylsuccinic anhydride (DDSA), polysebacic polyanhydride, and polyazelaic polyanhydride.

Further suitable epoxy curing agents are the amines, including aromatic amines, e.g., 1,3-diaminobenzene, 1,4-diaminobenzene, 4,4'-diamino-diphenylmethane, 4,4'-methylenebis(2-ethylaniline) and the poly-aminosulphones, such as 4,4'-diaminodiphenyl sulphone (4,4'-DDS), and 3,3'-diaminodiphenyl sulphone (3,3'-DDS), bis(4-amino-3-methyl-5 isopropylphenyl) methane, diethyltoluenediamine, 1,3-propanediol bis(4-aminobenzoate), fluorene derivatives such as bis(4-amino-phenyl)fluorene).

A wide variety of commercially available compositions may be used as curing agents in the present invention. One preferred commercially available dicyandiamide is Dyhard 100, which is available from Evonik Industries (Marl, Germany).

Additional suitable epoxy curing agents include imidazole (1,3-diaza-2,4-cyclopentadiene), 2-ethyl-4-methylimidazole, and boron trifluoride amine complexes, such as Anchor 1170, available from Air Products & Chemicals, Inc. (Allentown, Pa.).

The curing agent(s) are selected such that they provide curing of the resin composition when combined therewith at suitable temperatures. The amount of curing agent required to provide adequate curing of the resin component will vary depending upon a number of factors including the type of resin being cured, the desired curing temperature and curing time. The particular amount of curing agent required for each particular situation may be determined by well-established routine experimentation.

Exemplary preferred curing agents include dicyandiamide, 4,4'-diaminodiphenyl sulphone (4,4'-DDS) and 3,3'-diaminodiphenyl sulphone (3,3'-DDS). Dicyandiamide is preferably present in amounts of between 0 wt % and 10 wt % of the total resin composition. 4,4'-DDS and 3,3'-DDS curing agents are present in amounts that range from 5 wt % to 45 wt % of the uncured resin composition. Preferably, either or both of these polyaminosulfone curing agents are present in amounts that range from 10 wt % to 30 wt %.

The uncured resin composition may also include additional ingredients, such as performance enhancing or modifying agents. The performance enhancing or modifying agents, for example, may be selected from flexibilizers, toughening agents/particles, accelerators, core shell rubbers, flame retardants, wetting agents, pigments/dyes, UV absorbers, anti-fungal compounds, fillers, conducting particles and viscosity modifiers.

Suitable accelerators are any of the urone compounds that are commonly used in aerospace applications. Specific examples of accelerators, which may be used alone or in combination, include N,N-dimethyl, N'-3,4-dichlorphenyl urea, N'-3-chlorophenyl urea, and preferably N,N-(4-methyl-m-phenylene bis[N',N'-dimethylurea], which is available commercially as Dyhard UR500 from Evonik Industries (Marl, Germany).

Suitable fillers include, by way of example, any of the following either alone or in combination: silicas, aluminas, titania, glass, calcium carbonate, calcium oxide and magnesium oxide.

Suitable conducting particles, by way of example, include any of the following either alone or in combination: silver, gold, copper, aluminum, nickel, conducting grades of carbon, buckminsterfullerene, carbon nanotubes and carbon nanofibers. Metal-coated fillers may also be used, for example nickel coated carbon particles and silver or copper coated glass particles.

The thermoplastic material used to form the irradiated toughening agent is preferably provided in particulate form. However the thermoplastic material may be provided in other forms, such as flakes, granules, films or liquids, provided that the material can be uniformly subjected to high-energy radiation. The amount and type of radiation used to irradiate the thermoplastic material may be varied depending upon the particular types of thermosetting and thermoplastic materials that are being used to make the uncured resin composition. Irradiation of the thermoplastic with an electron beam or gamma rays is preferred. Other high-energy radiation beams, such as X-Rays, neutron beams and proton beams, may be used provided that the same level of radiation exposure that is achieved with electron beam is obtained. The use of electron beams is particularly preferred.

The thermoplastic material may be exposed to the high-energy radiation source in any manner that provides uniform exposure of the material. Preferably, the thermoplastic material is in particulate form where the particle sizes range from 0.2 microns to 100 microns. Particle sizes of 1 micron to 100 microns are preferred. The particles may be exposed to the high-energy radiation source as a fluidized bed of particles or as a fixed bed of particles. When the particles are in the form of a fixed bed, the thickness of the particulate bed should be from 1 mm to 100 mm. This type of fixed bed forms a layer of particles that can be uniformly irradiated by exposing both sides of the particulate layer to the high-energy radiation source. The two sides of the particulate layer can be exposed simultaneously or alternately, provided that both sides receive approximately the same degree of radiation exposure. Irradiation can be carried out in a sequence of several lower level exposures or one higher level exposure. Fixed particulate beds having thicknesses on the order of from 10 mm to 40 mm are preferred when the particles are being exposed to electron beam radiation.

The thermoplastic material may be contained for irradiation within suitable containers including bags, boxes, sacks or other types providing these containers do not significantly affect the radiation dose received. Paper sacks, polyethylene bags and cardboard boxes are very suitable.

Radiation of the thermoplastic polymer may be conducted in atmospheres of controlled composition or in normal ambient air or in vacuum (partial or full). For example, the atmosphere may be depleted of oxygen or there may be added certain volatile compounds or gases to create variable chemical species on the irradiated polymer.

The amount of radiation exposure that the particles are subjected to should be sufficient to slightly increase the concentration of carbon-carbon bonds in the thermoplastic material, as measured by X-ray Photoelectron Spectroscopy (XPS). This is consistent with some chemical branching or grafting of the polymer. An increase in the concentration of certain types of proton is also visible in the $^1$H NMR spectrum. For example, in a sample exposed to radiation the integral of all protons between 7.4 and 7.9 ppm increased from 0.03 to 0.04 (taking a value of 1.000 for the aromatic proton peak at 8.0 ppm). The amount of radiation exposure should be such that the desired levels of proton and/or carbon-carbon bond increase is observed without adversely affecting the chemical behaviour of the polymer. For example, if it is desired to subsequently process the irradiated polymer by solvent means, the radiation exposure should not grossly affect the solubility of the irradiated particles in the usual solvents for the thermoplastic material, such as MEK and N-methylpyrrolidone.

Another way to confirm that the particles have received the desired amount of radiation exposure is to observe the color of the thermoplastic particles. The desired amount of radiation exposure is reached when the color of the particles changes from the usual white color or pale straw color to a light yellow or amber color. In addition, the molecular weight of the thermoplastic particles can be used to determine the appropriate amount of radiation exposure. The molecular weight should increase from 5 to 100 percent. Preferred increases in molecular weight due the radiation exposure are on the order of from 10 to 100 percent.

Another way to confirm that the thermoplastic particles have been subjected to sufficient high-energy radiation is to measure the decrease in cloud point temperature of a given epoxy/thermoplastic particle mixture that results from irradiation of the thermoplastic particles. The cloud point temperature should decrease from 2 to 20 degrees Celsius and preferably from 5 to 15 Celsius. The cloud point temperature of an epoxy resin is a measurement that can be made to determine the compatibility of various type of thermoplastic loaded into a given epoxy resin. The thermoplastic polymer to be tested is fully dissolved in the liquid resin to produce a clear solution. The temperature is then raised slowly (for example at 1 degree per minute). The cloud point is recorded when the polymer/resin mixture begins to show turbidity. The cloud point varies with polymer concentration, polymer molecular weight and epoxy type. Typically, for the system PES/diglycidyl ether of Bisphenol A, a minimum cloud point occurs at approximately 2-4 weight percent of PES. Bisphenol A based epoxies are particularly sensitive for showing this cloud point phenomenon with PES.

As an example, the cloud point of a standard bisphenol A epoxy resin in which 2 wt % of non-irradiated thermoplastic particles (e.g. PES or PES/PEES mixture) are dissolved should have a cloud point temperature of between about 100° C. and 105° C. When the thermoplastic particles are irradiated in accordance with the present invention to form an irradiated thermoplastic toughening agent, the cloud point temperature should drop from 5° C. to 15° C. Preferably, the cloud point temperature will drop about 10° C.

It was found that the above-described changes in physical/chemical properties of the irradiated thermoplastic particles can be routinely obtained by subjecting the particles to between 50 and 300 kiloGray (kGy) of either electron beam radiation or gamma ray radiation. 1 Gray of radiation (abbreviated by Gy) is equivalent to the absorption of 1 Joule per kilogram of material. It is preferred that the particles be subjected to from 100 to 275 kGy of radiation with around 250 kGy being particularly preferred.

The irradiated thermoplastic toughening agents are used in the same manner as their non-irradiated counterparts to form uncured resin compositions in accordance with standard resin and prepreg matrix processing. In general, the various thermosetting resins, thermoplastics and irradiated thermoplastics are mixed together at 90° C. to disperse the thermoplastics then heated to 130° C. to dissolve the thermoplastic. The mixture may then be cooled down to 90° C. or below and the remainder of the ingredients (additional irradiated toughening agent, curing agent and additives/fillers, if any) are mixed into the resin to form the uncured resin composition.

It is preferred that substantially all of the thermoplastic toughening agent that is used in a particular resin formulation be pre-treated with radiation as described above in order to maximize the reduction in micro crack formation. However, irradiated thermoplastic toughening agent may be mixed with small amounts of non-irradiated thermoplastic toughening agent provided that a reduction in micro crack formation in the cured resin is observed. It is preferred that no more than 30 wt % of the thermoplastic toughening agent be non-irradiated.

The uncured resin compositions may be used in a wide variety of applications where resistance to micro cracking is desired. A principal application is in the formation of prepreg where the uncured resin composition is applied to a fibrous reinforcement in accordance with any of the known prepreg manufacturing techniques. The fibrous reinforcement may be fully or partially impregnated with the uncured resin. In the latter case, the uncured resin may be applied to the fibrous reinforcement as a separate layer, which is proximal to, and in contact with, the fibrous reinforcement, but does not substantially impregnate the fibrous reinforcement. The prepreg is typically covered on both sides with a protective film and rolled up for storage and shipment at temperatures that are typically kept well below room temperature to avoid premature curing. The uncured resin compositions may be used with any of the other prepreg manufacturing processes and storage/shipping systems.

The fibrous reinforcement of the prepreg may be selected from hybrid or mixed fiber systems, which include synthetic or natural fibers, or a combination thereof. The fibrous reinforcement may preferably be selected from any suitable material such as fiberglass, carbon or aramid (aromatic polyamide) fibers. The fibrous reinforcement is preferably carbon fibers.

The fibrous reinforcement may comprise cracked (i.e. stretch-broken) or selectively discontinuous fibers, or continuous fibers. The use of cracked or selectively discontinuous fibers may facilitate lay-up of the composite material prior to being fully cured, and improve its capability of being shaped. The fibrous reinforcement may be in a woven, non-crimped, non-woven, unidirectional, or multi-axial textile structure form, such as quasi-isotropic chopped prepreg. The woven form may be selected from a plain, satin, or twill weave style. The non-crimped and multi-axial forms may have a number of plies and fiber orientations. Such styles and forms are well known in the composite reinforcement field, and are commercially available from a number of companies, including Hexcel Reinforcements (Dagneux, France).

The prepreg made using the uncured resins of the present invention may be in the form of continuous tapes, towpregs, webs, or chopped lengths (chopping and slitting operations may be carried out at any point after impregnation). The prepreg may be an adhesive or surfacing film and may additionally have embedded carriers in various forms both woven, knitted, and non-woven. The prepreg may be fully or only partially impregnated, for example, to facilitate air removal during curing.

The prepreg may be molded using any of the standard techniques used to form composite parts. Typically, one or more layers of prepreg are placed in a suitable mold and cured to form the final composite part. The prepreg of the invention may be fully or partially cured using any suitable temperature, pressure, and time conditions known in the art. Typically, the prepreg will be cured in an autoclave at temperatures around 180° C. The composite material may alternatively be cured using a method selected from UV-visible radiation, microwave radiation, electron beam, gamma radiation, or other suitable thermal or non-thermal radiation.

An exemplary uncured resin composition in accordance with the present invention includes between about 22 wt % and 25 wt % Bisphenol-F or A diglycidyl ether; between about 25 wt % and 30 wt % triglycidyl-(m or p)-aminophenol (trifunctional epoxy resin); between about 17 wt % and 21 wt % diaminodiphenylsulphone (primarily 4,4-DDS as a curing agent); and between about 20 wt % and 35 wt % PES, PEES or PES/PEES which has been irradiated as described above.

Examples of practice are as follows:

EXAMPLE 1

Preparation of Irradiated Thermoplastic Toughening Agents

Seven exemplary irradiated thermoplastic toughening agents in accordance with the present invention were prepared as follows:

Six 1 kg samples of PES/PEES powder (Solvay Radel A105P SFP grade) were sealed separately inside polyethylene bags to give a final thickness of approximately 25 mm. The six bags were then sealed within flat cardboard cartons about 20 cm×30 cm. The cartons were exposed to electron beams at total levels of 64, 128 and 255 kGy and gamma radiation at levels of 51, 100 and 200 kGy. The boxes were turned over half way through the exposure to ensure good coverage of the powder by the beam. The resulting six powders were light yellow in color compared to the off-white color of the starting powders. The powder irradiated with 255 kGy was slightly more yellow than the powder irradiated with 64 kGy.

A 1 kg sample of PES powder (Sumikaexcel 5003P) was also sealed inside polyethylene bags to give a final thickness of approximately 25 mm then sealed within flat cardboard cartons about 20 cm×30 cm. The carton was exposed to electron beams at 275 kGy. The resulting powder was light yellow in color compared to the off-white color of the starting powder.

No significant difference in chemical composition of the powders was detected by X-ray photoelectron spectroscopy (XPS) analysis, other than a slight increase in the concentration of carbon-carbon and carbon-hydrogen bonds. As previously mentioned, this is consistent with some chemical branching and grafting. The powder that was irradiated with 255 kGy had an increase in the C1s signal of approximately 5 percent. All of the irradiated powders were fully soluble in the usual solvents for PES and PEES including dimethylsulfoxide and N-methylpyrrolidone.

EXAMPLE 2

Preparation and Testing of Resin Composition with Tri- and Tetra-Functional Epoxy The following method was used to prepare exemplary uncured resin composition that contain tri-functional and tetra-functional epoxy resin in combination with the irradiated thermoplastic toughening agents prepared in Example 1.

737 g of the tetraglycidyl amine of methylenebisaniline (Araldite MY9512) and 654 g the triglycidyl derivative of p-aminophenol (MY0510) were added to a Winkworth mixer at room temperature and heating started. 442 g of irradiated PES/PEES or PES powder was added and mixed until dispersed. The mix was heated to 130° C. and mixed for 2 hours to dissolve the irradiated powder. The mix was cooled to 90° C. to 100° C. At this stage, 167 g of a 50/50 blend of MY0510 and dicyandiamide (Dyhard 100) was added and mixed until dispersed to provide the uncured resin composition. Seven different uncured resin compositions were prepared using the seven irradiated PES/PEES and PES powders that were prepared in Example 1.

The seven uncured resin compositions were used to form seven resin films using a Dixon Coater and Akrosil release paper (NAT 120 G GL SILOX G1D/D8B). The roller temperature was 80° C. with a roll gap of 0.005 inches (0.013 cm) and a line speed of 2.0 m/min. The resulting films were used to prepare prepreg on a woven carbon fabric of 3K Torayca T300 fibres in a five-harness construction with 280 g/m² fibre weight. This fabric is commercially available as G0803 5 1200 from Hexcel Reinforcments, Dagneux. The films were laid on both sides of the fabric following the warp direction. Squares of 300 mm×300 mm were cut from the prepared prepreg and place under a vacuum bag for at least 10 minutes to ensure good consolidation of the prepreg. Test panels containing the seven different uncured resin compositions were prepared using 8 layers of 0/90° oriented prepreg squares. The test panels were cured in a standard autoclave at heating rates of 1 to 2° C., a maximum temperature of 175° C. (dwell time of 1 hr) and a cooling rate of 3° C.

To test for solvent-induced micro cracking, 20 mm×10 mm samples were cut from each test panel and mounted in Struers Epofix resin. The mounted samples were allowed to cure for at least 12 hours before polishing on a Beuhler PowerPro 5000 grinding/polishing machine. The polished samples were assessed for micro cracks before being exposed to solvent to ensure that no micro cracks were created during sample preparation. The samples were then immersed in MEK with the polished side facing upwards. After 1, 2 and 7 days, each sample was removed from the solvent and evaluated using a Leica DM L light microscope using a magnification of 50 times for initial observations and increasing magnification when focusing on possible cracks. The samples were then immersed in MEK with the polished side facing upwards. After evaluation, each sample was re-immersed in the solvent No micro cracks were observed in the polished resin sample containing PES/PEES irradiated with 255 kGy electron beam until day 7 when only a few fine micro cracks were observed. The sample containing PES irradiated with 275 kGy electron beam did not crack even after day 14.

TABLE 1 shows the severity of micro cracks after 1, 7 and 14 days in MEK. The severity of micro-cracking is ranked from 1 to 10 where 1 is severe cracking and 10 is no cracking at all. The rating is based on visual assessment of both the size and quantity of cracks.

TABLE 1

| Sample | PES used | Treatment type | Treatment level | Severity of microcracking after x days in MEK* | | |
|---|---|---|---|---|---|---|
| | | | | 1 day | 7 day | 14 day |
| AT-7 | Sumikaexcel 5003P | E-beam | 275 kGy | 10 | 10 | 10 |
| AT-8 | Radel A 105 SFP | E-beam | 64 kGy | 3 | 3 | 3 |
| AT-9 | Radel A 105 SFP | E-beam | 128 kGy | 3 | 3 | 3 |
| AT-3 | Radel A 105 SFP | E-beam | 255 kGy | 10 | 9 | |
| AT-10 | Radel A 105 SFP | gamma | 51 kGy | 2 | 2 | 2 |
| AT-11 | Radel A 105 SFP | gamma | 100 kGy | 3 | 3 | 3 |
| AT-12 | Radel A 105 SFP | gamma | 200 kGy | 3 | 3 | 3 |

COMPARATIVE EXAMPLE 1

Comparative uncured resin compositions were made in the same manner as Example 2, except that non-irradiated PES/PEES powder (Solvay Radel A105P SFP grade) and non-irradiated PES powder (Sumikaexcel 5003P) were used instead of the powders that were irradiated in accordance with the present invention.

Two comparative test samples were prepared using the comparative uncured resin compositions. The two comparative test samples were tested in the same manner as Example 2. Numerous significant cracks were observed in the comparative test sample based on non-irradiated PES/PEES powder at day 1. Over 100 micro cracks were observed in the comparative test sample based on non-irradiated PES powder at day 1.

TABLE 2 shows the severity of micro cracks after 1, 7 and 14 days in MEK. Again, the severity of microcracking is ranked from 1 to 10 where 1 is severe cracking and 10 is no cracking at all. The rating is based on visual assessment of both the size and quantity of cracks.

TABLE 2

| Sample | PES used | Severity of microcracking after x days in MEK* | | |
|---|---|---|---|---|
| | | 1 day | 7 day | 14 day |
| Standard | 5003P | 1 | 1 | 1 |
| AT-2 | Radel A 105 SFP | 1 | 1 | |

EXAMPLE 3

Mechanical Performance of Laminates Made Using Irradiated PES and PES/PEES

The benefits of the reduced micro-cracking arising from the use of irradiated PES and PES/PEES copolymers on mechanical performance was measured by the determination of the Interlaminar Shear Strength (ILSS) of cured composite laminates. The ILSS of the laminates made from untreated PES and PES/PEES as described in Comparative Example 1 and laminates made with e-beam treated PES and PES/PEES, as described in Example 1 were measured, according to the test method EN2563. One set of test samples had no exposure to MEK solvent, the second set were immersed in MEK solvent for 6 days prior to testing. The reduction in ILSS after the solvent exposure is a measure of the amount of micro cracking in the samples. The results of the tests are set forth in TABLE 3. These ILSS tests demonstrate the improvement of the mechanical performance after MEK solvent exposure of laminates made from resins and prepregs incorporating irradiated PES in accordance with the present invention.

TABLE 3

| Sample | PES used | Treatment type | Treatment level | ILSS without MEK exposure/MPa | ILSS after 6 days in MEK*/MPa | retention of ILSS % |
|---|---|---|---|---|---|---|
| AT-7 | Sumikaexcel 5003P | E-beam | 275 kGy | 69.2 | 60.5 | 87.5 |
| Standard | Sumikaexcel 5003P | none | — | 63.1 | 30.9 | 49.0 |
| AT-8 | Radel A 105 SFP | E-beam | 64 kGy | 66.0 | 33.1 | 50.2 |
| AT-9 | Radel A 105 SFP | E-beam | 128 kGy | 68.6 | 37.9 | 55.2 |
| AT-3 | Radel A 105 SFP | E-beam | 255 kGy | 66.2 | 60.1 | 90.8 |
| AT-2 | Radel A 105 SFP | E-beam | none | 69.2 | | |

Having thus described exemplary embodiments of the present invention, it should be noted by those skilled in the art that the within disclosures are exemplary only and that various other alternatives, adaptations and modifications may be made within the scope of the present invention. Accordingly, the present invention is not limited by the above-described embodiments, but is only limited by the following claims.

What is claimed is:

1. A prepreg comprising:
an uncured resin composition comprising a thermosetting resin component, an irradiated thermoplastic toughening agent, which is present in an amount of from 5 to 50 weight percent of said uncured resin composition and a curing agent, wherein said irradiated thermoplastic toughening agent is a thermoplastic toughening agent selected from the group consisting of polyether sulfone, polyether ethersulfone, polyetherimide and polyphenyl sulfone that has been treated with between 255 and 300 kiloGray of high-energy radiation selected from the group consisting of electron beam radiation and gamma ray radiation; and
a fibrous reinforcement.

2. An uncured resin composition according to claim 1 wherein said thermosetting resin component is selected from the group consisting of epoxy resins, cyanate ester resins and bismaleimide resins.

3. An uncured resin composition according to claim 2 wherein said curing agent is selected from the group consisting of dicyandiamide and aromatic amines.

4. A prepreg according to claim 1 wherein said fibrous reinforcement is selected from the group consisting of carbon fibers, glass fibers and ceramic fibers.

5. A prepreg according to claim 4 wherein said thermosetting resin component is selected from the group consisting of epoxy resins, cyanate ester resins and bismaleimide resins.

6. A prepreg according to claim 5 wherein said curing agent is selected from the group consisting of dicyandiamide and aromatic amines.

7. A composite product comprising a prepreg according to claim 1 wherein said uncured resin composition has been cured.

8. A method for making a prepreg, said method comprising the steps of:
providing an uncured resin composition comprising a thermosetting resin component, an irradiated thermoplastic toughening agent, which is present in an amount of from 5 to 50 weight percent of said uncured resin composition and a curing agent, wherein said irradiated thermoplastic toughening agent is a thermoplastic toughening agent selected from the group consisting of polyether sulfone, polyether ethersulfone, polyetherimide and polyphenyl sulfone that has been treated with between 255 and 300 kiloGray of high-energy radiation selected from the group consisting of electron beam radiation and gamma ray radiation; and
combining said uncured resin composition with a fibrous reinforcement.

9. A method for making a prepreg according to claim 8 wherein said thermosetting resin component is selected from the group consisting of epoxy resins, cyanate ester resins and bismaleimide resins.

10. A method for making a prepreg according to claim 9 wherein said curing agent is selected from the group consisting of dicyandiamide and aromatic amines.

11. A method for making a composite product comprising the step of curing said uncured resin composition that is present in the prepreg according to claim 1.

12. A method according, to claim 8 which includes the additional step of curing said uncured resin composition.

13. A prepreg according to clam 1 wherein said high-energy radiation is electron beam radiation.

14. A method for making a prepreg according to claim 8 wherein said high-energy radiation is electron beam radiation, 15. A prepreg according to claim 1 wherein said thermoplastic toughening agent is polyethersulfone.

16. A method for making a prepreg according to claim 8 wherein said thermoplastic toughening agent is polyethersulfone.

17. A prepreg according to claim 2 wherein said thermosetting resin component is selected from the group consisting of difunctional epoxy resin, trifunctional epoxy resin and tetrafunctional epoxy resin.

18. A prepreg according to claim 1 wherein said thermoplastic toughening agent has been treated with between 255 and 275 kiloGray of high-energy radiation.

19. A method for making a prepreg according to claim 9 wherein said thermosetting resin component is selected from the group consisting of difunctional epoxy resin, trifunctional epoxy resin and tetrafunctional epoxy resin.

20. A method for making a prepreg according to claim 8 wherein said thermoplastic toughening agent has been treated with between 255 and 275 kiloGray of high-energy radiation.

* * * * *